US010535229B2

(12) United States Patent
Olive

(10) Patent No.: US 10,535,229 B2
(45) Date of Patent: Jan. 14, 2020

(54) SYSTEM AND METHOD FOR PROVIDING A FEATURE GAME

(71) Applicant: Aristocrat Technologies Australia Pty Limited, North Ryde, NSW (AU)

(72) Inventor: Scott Christopher Olive, Narrabeen (AU)

(73) Assignee: ARISTOCRAT TECHNOLOGIES AUSTRALIA PTY LIMITED, North Ryde, NSW (AU)

( * ) Notice: Subject to any disclaimer, the term of this patent is extended or adjusted under 35 U.S.C. 154(b) by 0 days.

(21) Appl. No.: 15/428,813

(22) Filed: Feb. 9, 2017

(65) Prior Publication Data

US 2017/0154498 A1 Jun. 1, 2017

Related U.S. Application Data

(63) Continuation-in-part of application No. 15/149,060, filed on May 6, 2016, which is a continuation of application No. 14/823,536, filed on Aug. 11, 2015.

(30) Foreign Application Priority Data

Aug. 11, 2014 (AU) ................................ 2014903132
Feb. 11, 2016 (AU) ................................ 2016900462

(51) Int. Cl.

*A63F 13/00* (2014.01)
*G07F 17/32* (2006.01)
*G07F 17/34* (2006.01)

(52) U.S. Cl.

CPC ........ *G07F 17/3262* (2013.01); *G07F 17/326* (2013.01); *G07F 17/3213* (2013.01);

(Continued)

(58) Field of Classification Search

CPC .. G07F 17/34; G07F 17/3244; G07F 17/3267; G07F 17/3213

See application file for complete search history.

(56) References Cited

U.S. PATENT DOCUMENTS 7,070,501 B2 * 7/2006 Cormack ........... G06Q 30/0209 463/12
8,360,851 B2 1/2013 Aoki et al.

(Continued)

FOREIGN PATENT DOCUMENTS

AU 2013202658 1/2014
AU 2013251288 5/2014

(Continued)

OTHER PUBLICATIONS

Australian Examination Report for AU2016100230, dated May 11, 2016. (5 pages).

(Continued)

*Primary Examiner* — David L Lewis
*Assistant Examiner* — Eric M Thomas
(74) *Attorney, Agent, or Firm* — McAndrews, Held & Malloy, Ltd.

(57) ABSTRACT

A gaming machine. A memory stores a first set of symbols including first, second, and third symbols, and a second set of replacement symbols. A symbol selector selects symbols from the set of symbols, displays the selected symbols, and selects a replacement symbol to replace a selected third symbol in response to the third symbol being selected. A value assigner randomly assigns a prize value to a selected first symbol. An outcome evaluator determines if the selected symbols include a defined number of first symbols, and triggers a feature game when a defined number of first symbols are selected. Until an end condition is met in the feature game, the symbol selector causes the display to retain a selected first symbol, remove a selected second (Continued)

symbol, and replace the removed second symbol with a symbol selected from the feature game set of symbols.

30 Claims, 12 Drawing Sheets

(52) U.S. Cl.
CPC ...... *G07F 17/3225* (2013.01); *G07F 17/3244* (2013.01); *G07F 17/3258* (2013.01); *G07F 17/3267* (2013.01); *G07F 17/34* (2013.01); *G07F 17/3255* (2013.01)

(56) References Cited

U.S. PATENT DOCUMENTS 9,424,720 B2* 8/2016 Suda ........................ G07F 17/34
9,928,691 B2 3/2018 Olive
2003/0216165 A1 11/2003 Singer et al.
2004/0137982 A1 7/2004 Cuddy et al.
2006/0189369 A1 8/2006 Taylor
2007/0060248 A1 3/2007 Rodgers et al.
2009/0054129 A1 2/2009 Yoshimura et al.
2009/0239634 A1 9/2009 Nguyen
2010/0075737 A1 3/2010 Bluemel
2010/0210343 A1* 8/2010 Englman ................. G07F 17/32 463/20
2010/0234092 A1 9/2010 Gomez et al.
2012/0178517 A1* 7/2012 Montenegro ....... G07F 17/3244 463/20
2013/0331168 A1 12/2013 Street
2014/0274292 A1* 9/2014 Suda ........................ G07F 17/34 463/20
2014/0323198 A1 10/2014 Tuck
2015/0310699 A1 10/2015 Meyer
2016/0042597 A1 2/2016 Olive
2016/0253873 A1 9/2016 Olive
2017/0148274 A1 5/2017 Olive
2017/0154498 A1 6/2017 Olive
2018/0268655 A1 9/2018 Olive

FOREIGN PATENT DOCUMENTS

AU 2014202042 5/2014
EP 0984408 3/2000

OTHER PUBLICATIONS

Australian Examination Report for AU2015210489, dated Jun. 14, 2016. (5 pages).
Australian Examination Report for AU2016202727, dated Jul. 4, 2016. (5 pages).
Australian Examination Report for AU2017101097, dated Dec. 7, 2017. (3 pages).
Australian Examination Report for AU2017101629, dated Jan. 16, 2018. (3 pages).
Australian Examination Report for AU2017204560, dated Feb. 1, 2018. (3 pages).

* cited by examiner

SYSTEM AND METHOD FOR PROVIDING A FEATURE GAME

RELATED APPLICATIONS

This application is a continuation-in-part of U.S. patent application Ser. No. 15/149,060, having a filing date of May 6, 2016, which is a continuation of U.S. patent application Ser. No. 14/823,536, having a filing date of Aug. 11, 2015, which claims priority to Australian Provisional Patent Application No. 2014903132, having a filing date of Aug. 11, 2014. This application also claims priority to Australian Patent Application No. 2016900462, having a filing date of Feb. 11, 2016. The contents of each of the above-identified applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

The present invention relates to a gaming machine and a method of gaming.

BACKGROUND OF THE INVENTION

In existing gaming machines, feature games may be triggered for players in addition to the base game. A feature game gives players an additional opportunity to win prizes, or the opportunity to win larger prizes, than would otherwise be available in the base game. Feature games can also offer altered game play to enhance player enjoyment.

While such gaming machines provide players with enjoyment, a need exists for new gaming machines that are able to provide alternative feature games, in order to maintain or increase player enjoyment.

SUMMARY OF THE INVENTION

According to one aspect of the invention, there is provided a gaming machine comprising:

a symbol selector for selecting a plurality of symbols from a set of symbols for display during play of a game, the set of symbols including a plurality of non-configurable symbols, a plurality of configurable symbols, and a plurality of reveal symbols, the symbol selector configured to respond to one or more reveal symbols being selected by selecting a replacement symbol, from a set of replacement symbols that includes a configurable symbol, to replace each reveal symbol;

a value assigner for randomly assigning one prize value of plurality of prize values to at least each selected configurable symbol, including any configurable symbols that replace reveal symbols; and an outcome evaluator for monitoring play of the game, wherein a feature game is triggered in response to a trigger event, the trigger event comprising a defined number of configurable symbols being selected by the symbol selector for display;

wherein, until an end condition is met in the feature game, the symbol selector is further configured to:

1) hold any selected configurable symbols;

2) remove any selected non-configurable symbols from the display; and 3) replace any removed non-configurable symbol with another symbol selected from a feature game set of symbols that includes non-configurable symbols and configurable symbols.

In an embodiment, said configurable symbols may each comprise at least a common component and a variable component, said variable component being indicative of a value of a prize that is associated with a respective configurable symbol.

In an embodiment, at least one said value of a respective prize is generated by selecting one of a plurality of defined multipliers that is applied to an amount wagered.

In an embodiment, the plurality of defined multipliers are selected at random, a probability of selecting one of the plurality of defined multipliers being weighted based at least in part on the amount wagered.

In an embodiment, at least one of said values of the respective prizes comprises a defined value.

In an embodiment, at least one of said values of the respective prizes comprises a progressive value which increases for each wager that is placed on the base game by an amount proportional to said wager.

In an embodiment, the gaming machine further comprises a configurable symbols counter for counting each of said configurable symbol that is selected for display.

In an embodiment, the game is a free game of a series of free games triggered in response to a trigger event in a base game, the trigger event comprising a defined number of a defined symbol; being selected in the base game, and when the feature game is triggered, the configurable symbol counter is initiated to the number of selected configurable symbols that comprise the trigger event.

In an embodiment, the configurable symbol counter is incremented each time a configurable symbol is selected for display in the feature game.

In an embodiment, a jackpot is awarded when the configurable symbol counter counts a defined number of configurable symbols, the jackpot being a progressive prize that receives funding contributions from a plurality of other gaming machines.

In an embodiment, the gaming machine comprises a feature games counter for counting the number of feature games to be awarded in the feature game, wherein a defined number of feature games is initially awarded when the feature game is triggered.

In an embodiment, the feature game counter is reset to the defined number of feature games initially awarded each time a configurable symbol is selected for display in the feature game.

In an embodiment, the feature game counter is decremented each time no configurable symbols are selected for display in the feature game.

In an embodiment, the gaming machine further comprises an outcome evaluator for evaluating the outcome of the game and for awarding an accumulated prize based on said outcome, wherein the value of said accumulated prize is calculated by accumulating the respective prizes associated with each of the configurable symbols selected for display.

In another aspect, the invention provides an electronic method of gaming on a gaming machine comprising the steps of:

selecting, using a symbol selector, a plurality of symbols from a set of symbols for display during play of a game, the set of symbols including a plurality of non-configurable symbols, a plurality of configurable symbols, and a plurality of reveal symbols, the selecting including responding to one or more reveal symbols being selected by using the symbol selector to select a replacement symbol, from a set of replacement symbols that includes a configurable symbol, to replace each reveal symbol;

randomly assigning a prize value to each selected configurable symbol, including any configurable symbols that replace reveal symbols;

monitoring, using an outcome evaluator, play of the base game, wherein a feature game is triggered in response to a trigger event, the trigger event comprising a defined number of configurable symbols being selected by the symbol selector for display; and using the symbol selector until an end condition is met in the feature game to:

1) hold the selected configurable symbols;

2) remove any selected non-configurable symbols from the display; and 3) replace any removed non-configurable symbol with another symbol selected from a feature game set of symbols that includes non-configurable symbols and configurable symbols.

According to another aspect of the invention there is provided a computer program code which when executed by components of a controller of a gaming machine implements the above method.

According to another aspect of the invention there is provided a tangible computer readable medium comprising the above computer program code.

BRIEF DESCRIPTION OF THE DRAWINGS OF THE INVENTION

Features and advantages of certain embodiments of the present invention will become apparent from the following description of embodiments thereof, by way of example only, with reference to the accompanying drawings, in which.

Figure 1:
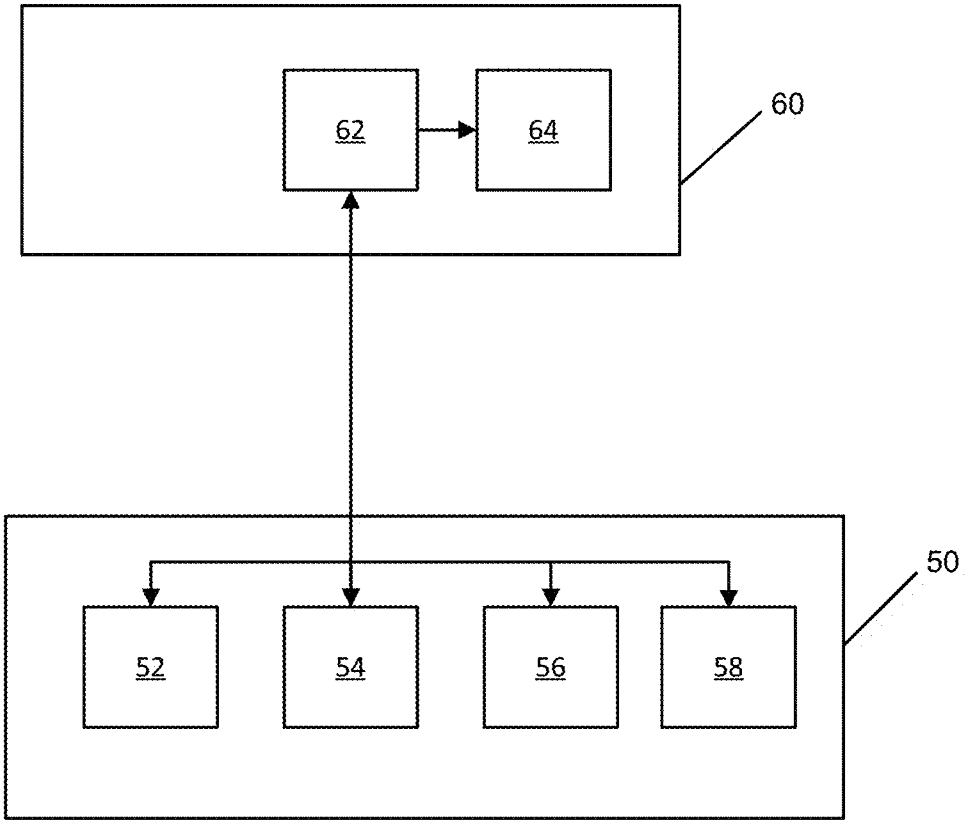
FIG. 1 is a block diagram of the core components of a gaming machine.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF A PREFERRED EMBODIMENT OF THE INVENTION

Referring to the drawings, there are shown example embodiments of gaming machines having components which enable the implementation a base game, from which may be triggered a series of free games or in a spin and hold feature game. In these embodiments, during the free games, symbols are selected from a set of symbols comprising a plurality of configurable symbols, non-configurable symbols and reveal symbols. If reveal symbols are selected for display, a replacement symbol is selected to replace the reveal symbol. The replacement symbol may be a configurable symbol. In one example, the gaming machine is configured so that the spin and hold feature game is triggered when six of the configurable symbols are selected for display. The invention is not limited to triggering a feature game only when six configurable symbols are selected, however. In other embodiments, a different number of configurable symbols may trigger the feature game.

Furthermore, each of the configurable symbols comprises a variable portion which is indicative of the value of a prize. When the feature game is triggered, the player is guaranteed to win the accumulated value of the prizes indicated by the variable portions of the configurable symbols.

General Construction of Gaming Machine

The gaming machine can take a number of different forms. In a first form, a standalone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a “thick client” architecture may be used wherein part of the game is executed on a player operable gaming machine and part of the game is executed remotely, such as by a gaming server; or a “thin client” architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming machine may operate in standalone gaming machine mode, “thick client” mode or “thin client” mode depending on the game being played, operating conditions, and so on. Other variations will be apparent to persons skilled in the art.

Irrespective of the form, the gaming machine 1 has several core components. At the broadest level, the core components are a player interface 50 and a game controller 60 as illustrated in FIG. 1. The player interface is arranged to enable manual interaction between a player and the gaming machine and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
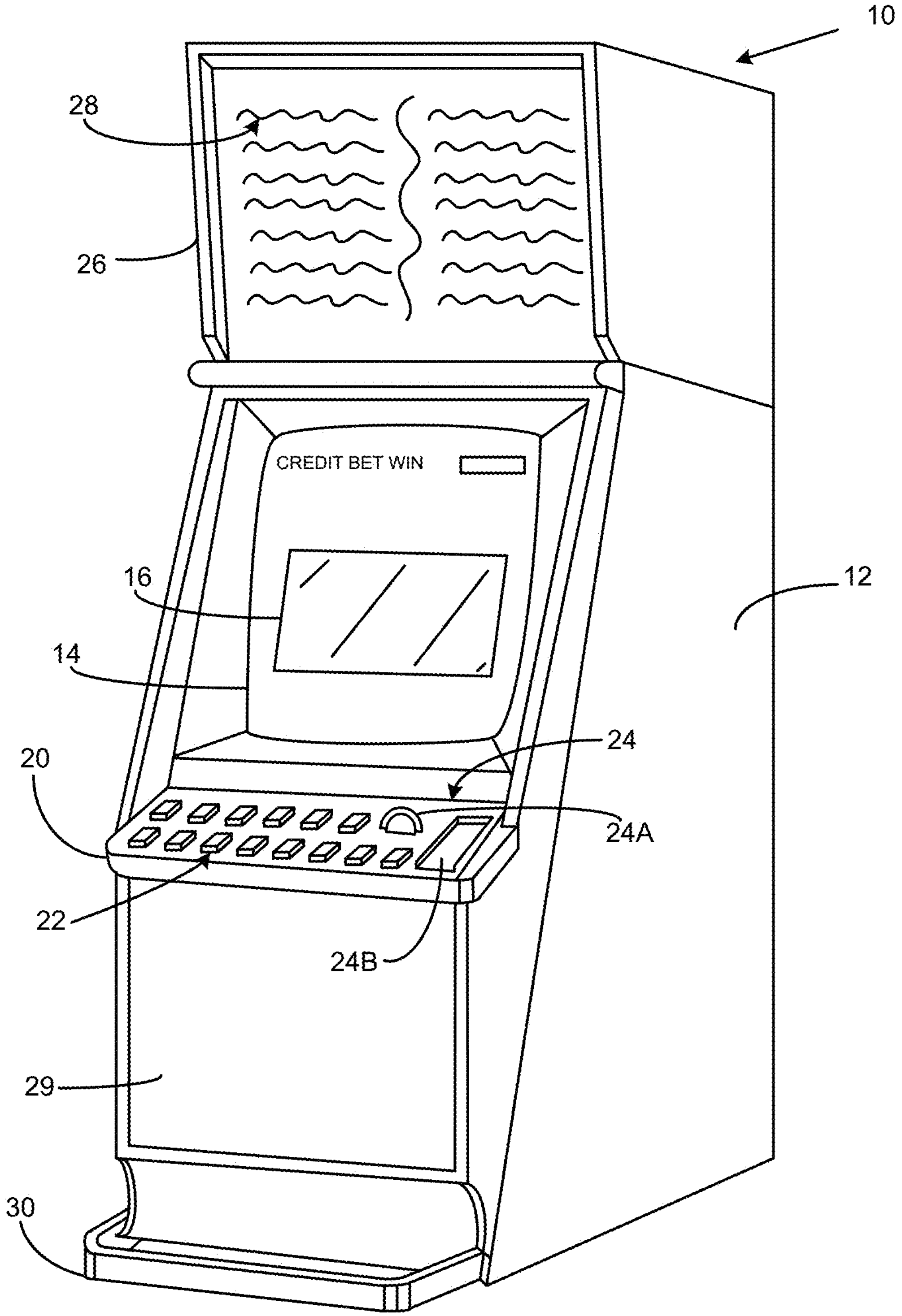
FIG. 2 is a perspective view of a standalone gaming machine.

A gaming machine in the form of a standalone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a liquid crystal display. Alternatively, the display 14 may be an OLED, plasma screen, any other suitable video display unit. The top box 26 may also include a display, for example a video display unit, which may be of the same type as the display 14, or of a different type.

Figure 3:
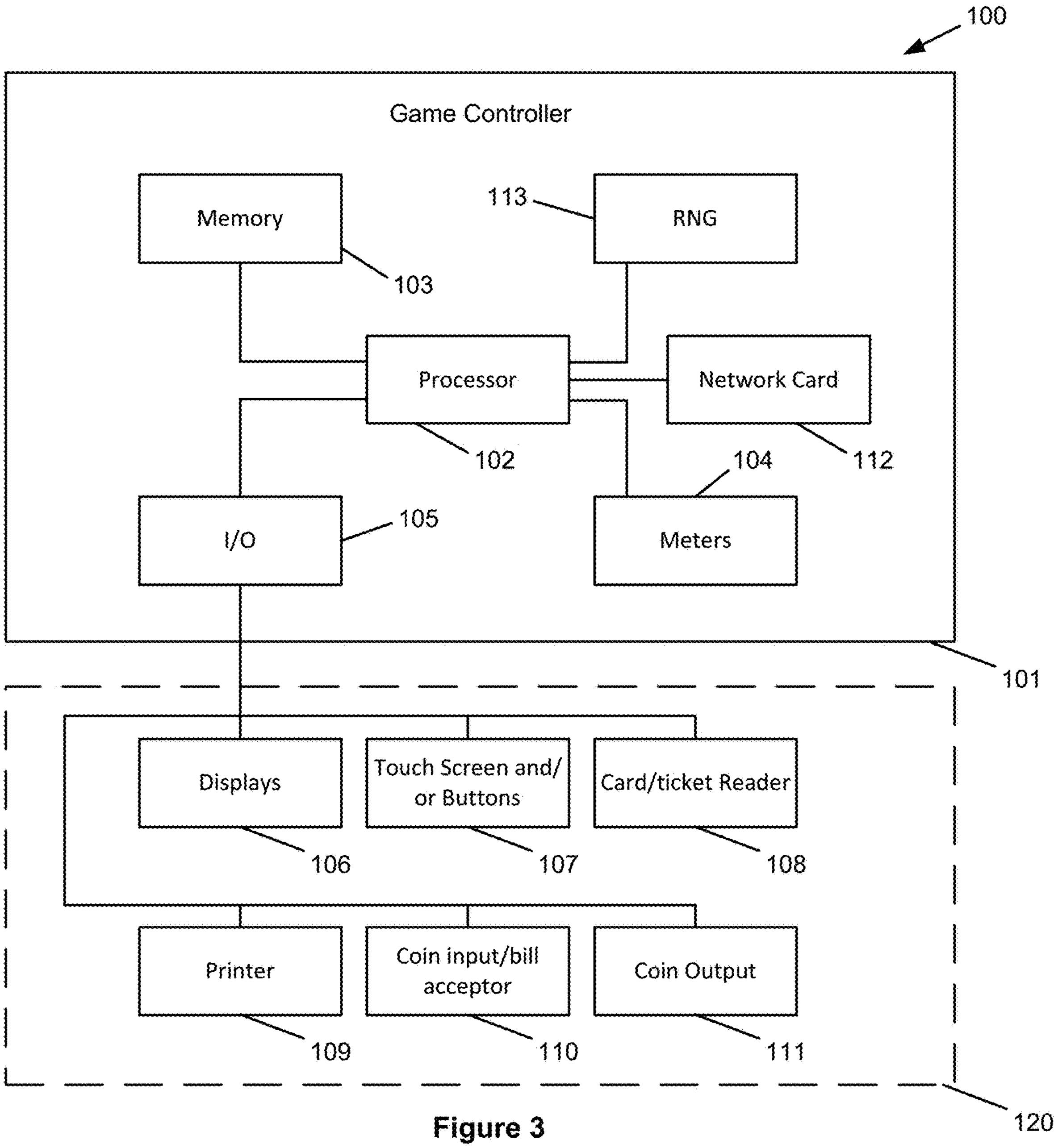
FIG. 3 is a block diagram of the functional components of a gaming machine.

FIG. 3 shows a block diagram of operative components of a typical gaming machine which may be the same as or different to the gaming machine of FIG. 2.

The gaming machine 10 includes a game controller 101 having a processor 102 mounted on a circuit board. Instructions and data to control operation of the processor 102 are stored in a memory 103, which is in data communication with the processor 102. Typically, the gaming machine 10 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
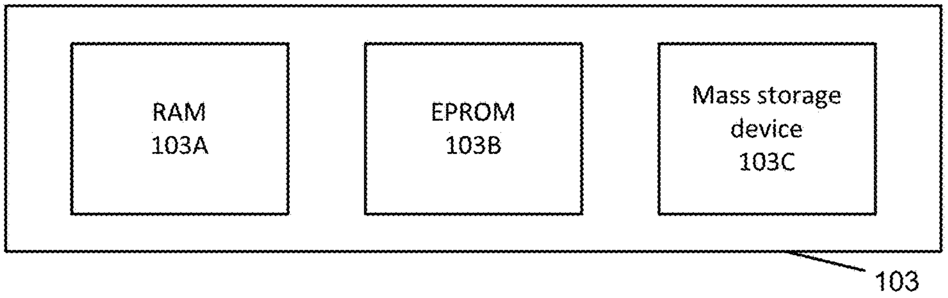
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
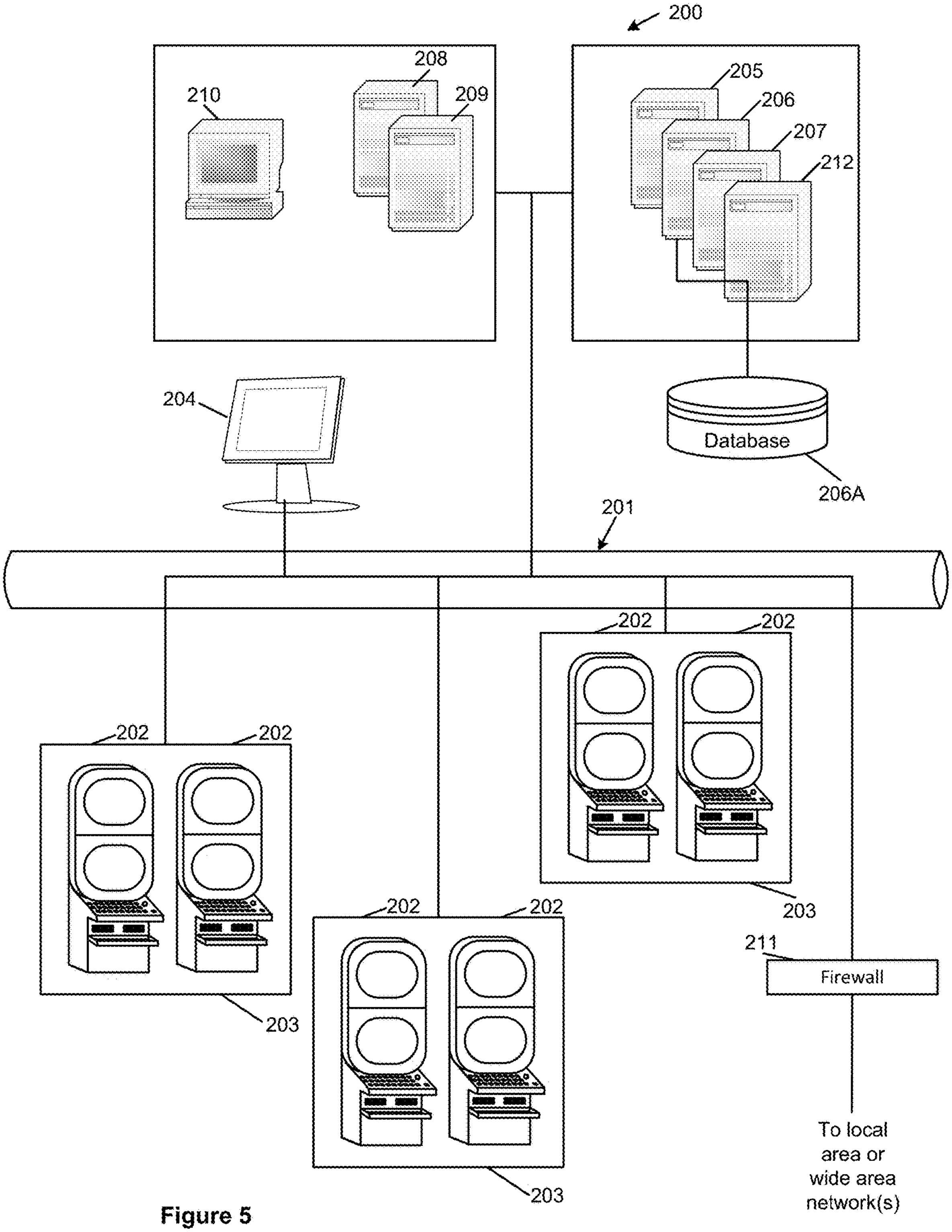
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5 are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming Machine

The player operates the game play mechanism 56 to specify a wager and hence the win entitlement which will be evaluated for this play of the game and initiates a play of the game. Persons skilled in the art will appreciate that a player's win entitlement will vary from game to game dependent on player selections. In most spinning reel games, it is typical for the player's entitlement to be affected by the amount they wager and selections they make (i.e. the nature of the wager). For example, a player's win entitlement may be based on how many lines they play in each game—e.g. a minimum of one line up to the maximum number of lines allowed by the game (noting that not all permutations of win lines may be available for selection) and how much they wager per line. Such win lines are typically formed by a combination of symbol display positions, one from each reel, the symbol display positions being located relative to one another such that they form a line.

In many games, the player's win entitlement is not strictly limited to the lines they have selected, for example, "scatter" pays are awarded independently of a player's selection of paylines and are an inherent part of the win entitlement.

Persons skilled in the art will appreciate that in other embodiments, the player may obtain a win entitlement by selecting a number of reels to play and an amount to wager per reel. Such games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reel, the active display positions being all display positions of each selected reel and the designated display position of the non-selected reels. As a result for five reels and fifteen display positions there are 243 ways to win.

Figure 6:
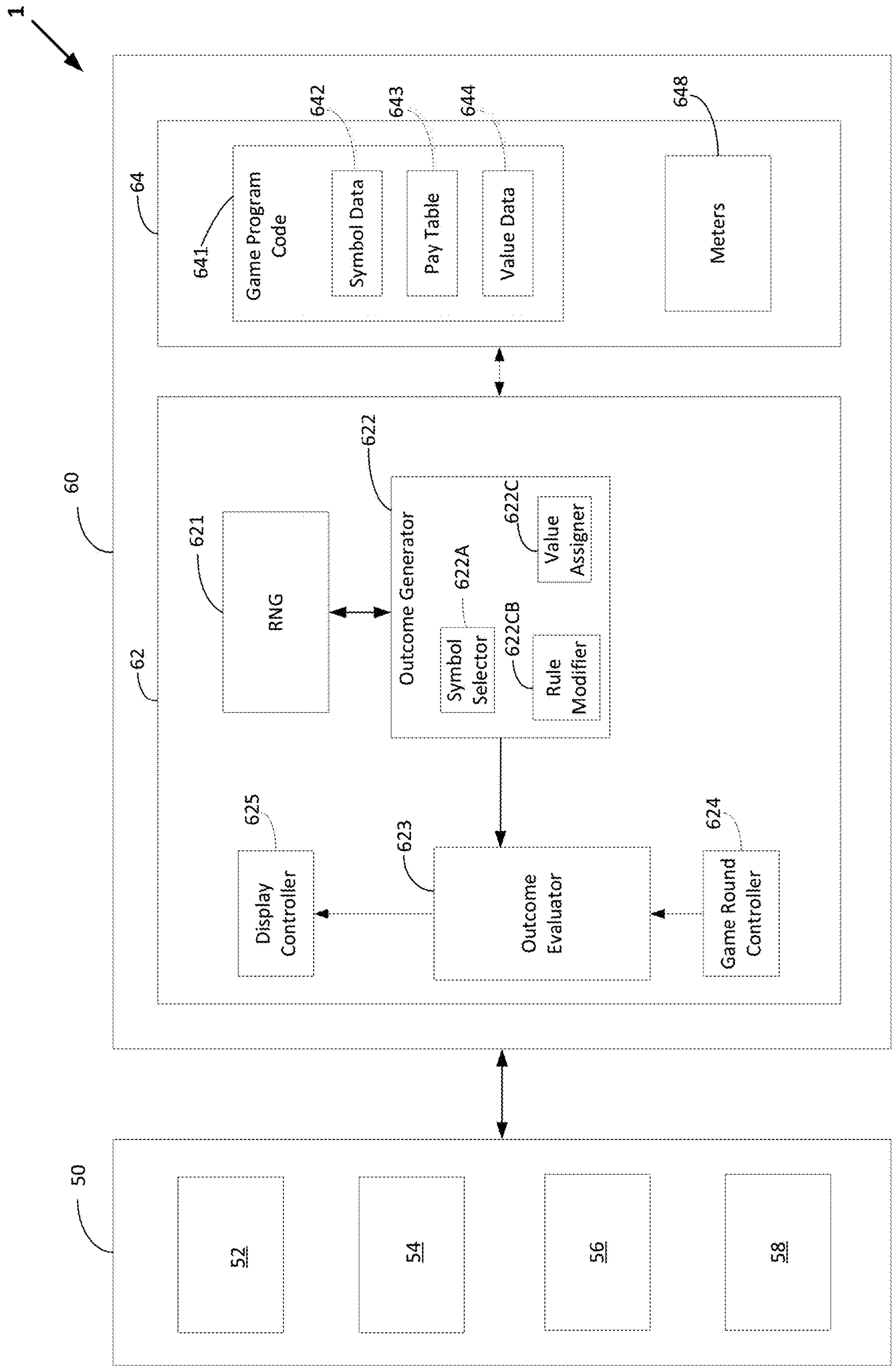
FIG. 6 is a further block diagram of a gaming machine.

In FIG. 6, the processor 62 of game controller 60 of gaming machine 1 is shown implementing a number of modules based on game program code 641 stored in memory 64. Persons skilled in the art will appreciate that various of the modules could be implemented in some other way, for example by a dedicated circuit.

These modules include the outcome generator 622 which operates in response to the player's operation of game play mechanism 56 to place a wager and initiate a play of the game and generates a game outcome which will then be evaluated by outcome evaluator 623. The first part of forming the game outcome is for a symbol selector 622A to select symbols from a set of symbols specified by symbol data 642 using random number generator 621. The selected symbols are advised to the display controller 625 which causes them to be displayed as a symbol display on display 54 at a set of display positions.

In the embodiment described below, the display positions of the symbol display are arranged in a rectangular matrix comprising a plurality of columns and a plurality of rows. However, in other arrangements as known in the gaming industry could be employed in embodiments of the invention. For example, in some arrangements there are more symbols in some columns than other, such as 3-4-3-4-3 arrangement of seventeen display positions corresponding to respective ones of five reels. In such arrangements, the columns of four symbols can be arranged so that they are off-set or staggered relative to the columns having two symbols so that the middle two symbols in the columns of four symbols share boundaries with two symbols of each neighbouring reel.

Figure 7:
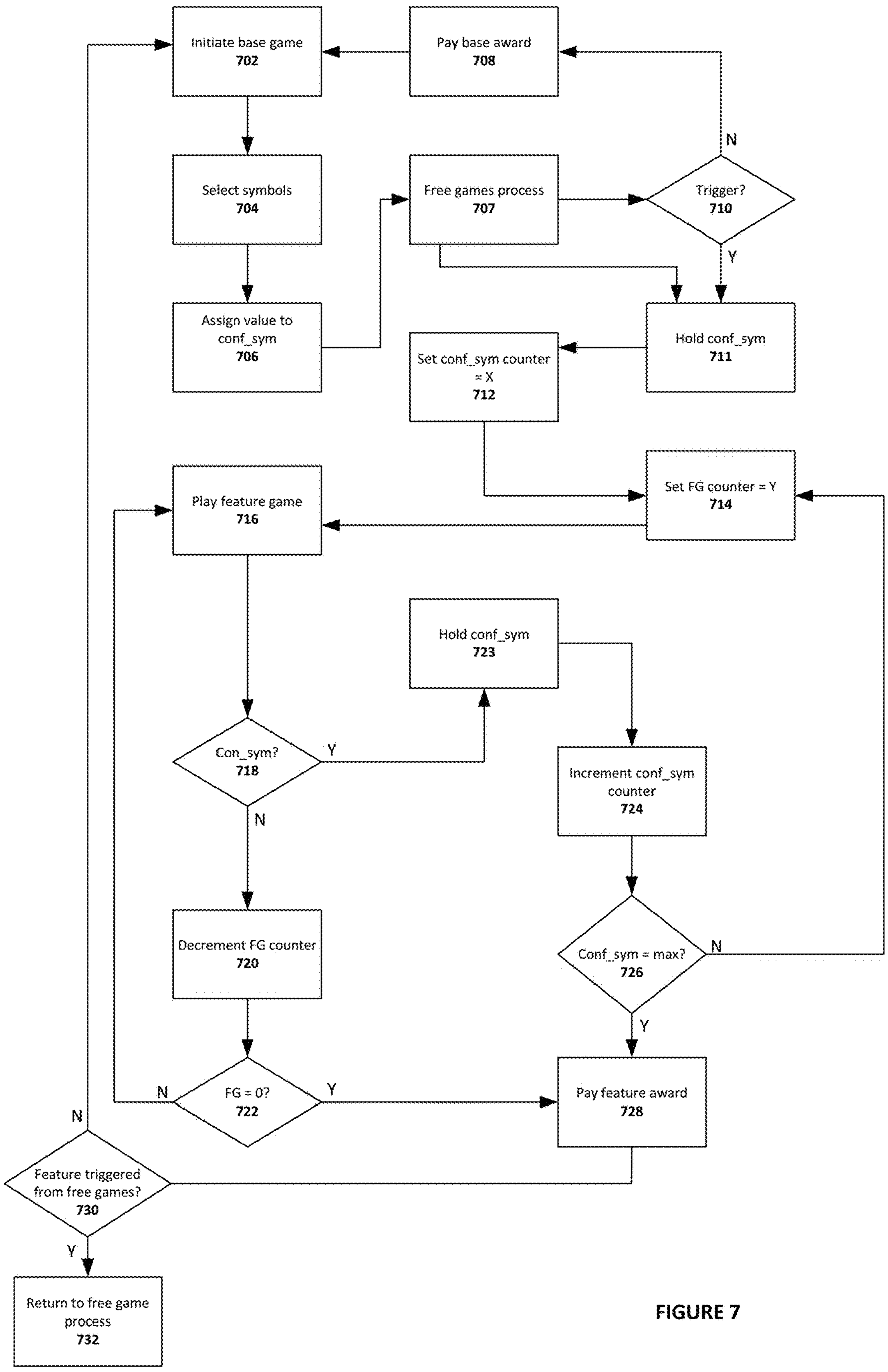
FIG. 7 is a flow diagram of a feature game of the gaming machine of FIG. 2.

FIG. 7 shows a flow diagram of one embodiment, in which a feature game may be triggered from play of the base game at step 702. In this embodiment, the base game comprises using symbol selector 622A to select a plurality of symbols from a set of symbols to display at the respective display positions arranged on display 54, at step 704. The set of symbols, which are stored as symbol data 642 in memory 64, comprises a plurality of configurable symbols and non-configurable symbols.

Figure 9C:
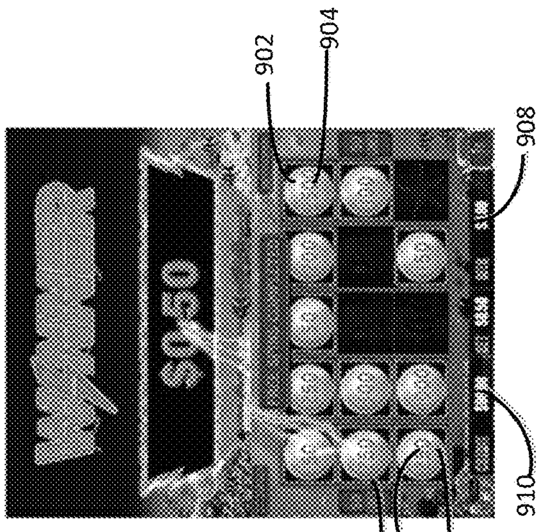
FIGS. 9A-9C are screen shots of the feature game of FIG. 7.
Figure 9B:
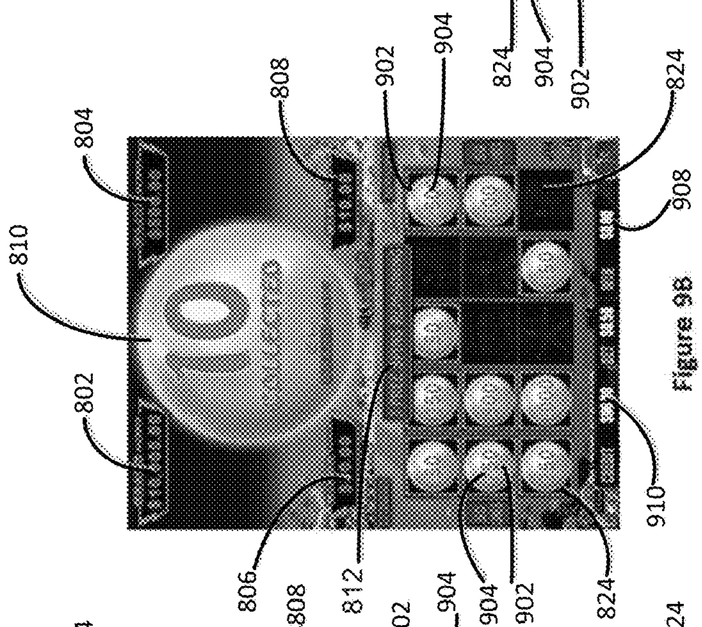
Figure 9A:
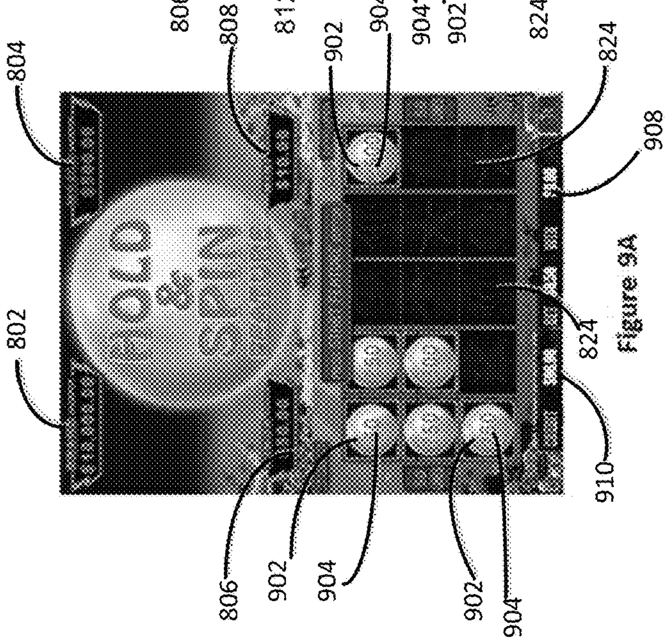
Figure 10B:
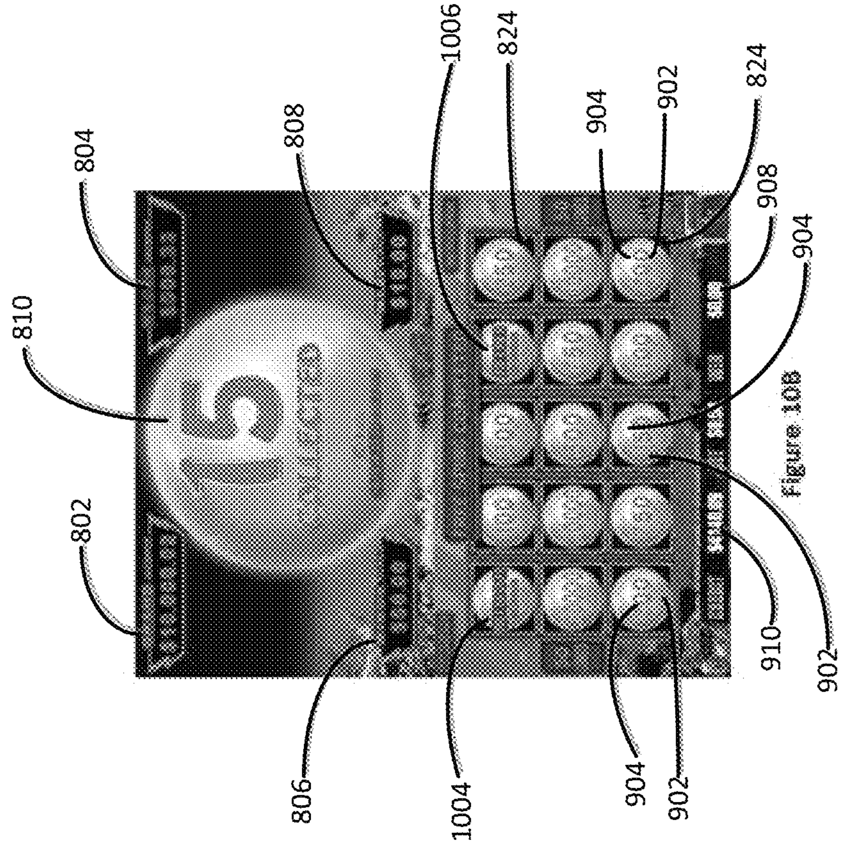
FIGS. 10A and 10B are screen shots of the feature game of FIG. 7, showing one of the progressive jackpot prizes being won.
Figure 10A:
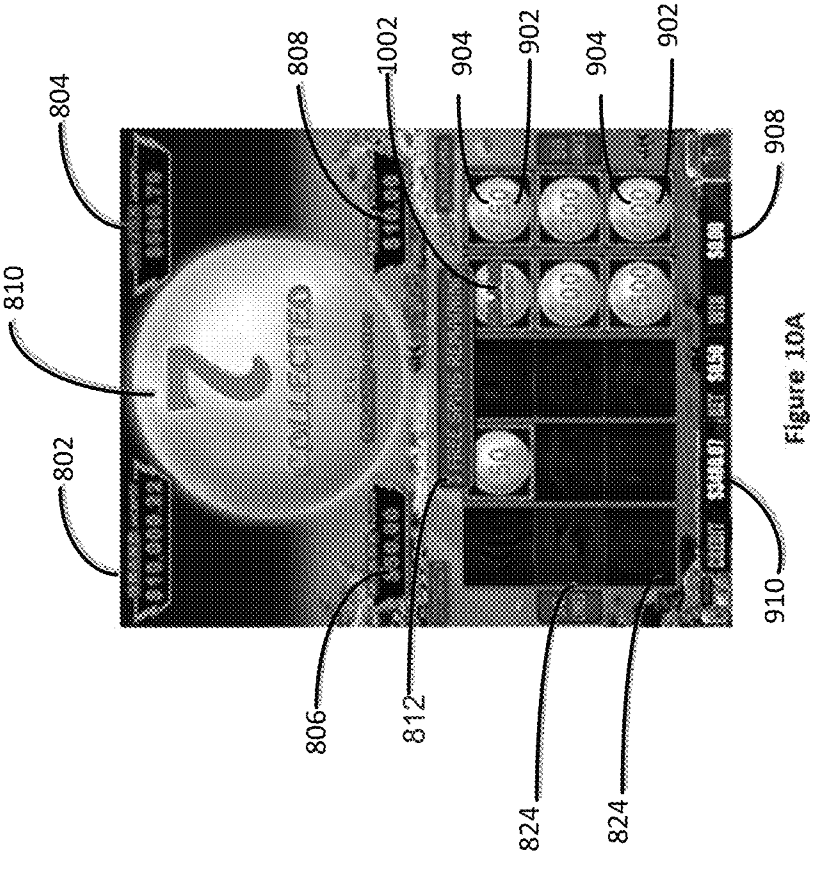

In an embodiment, the configurable symbols each comprise at least a common component and at least a variable component. The variable component is indicative of a value of a prize that is associated with each of the configurable symbols. An example of a configurable symbol is shown in FIGS. 9A-9C, in the form of a pearl symbol. The common component is the pearl itself 902, while the variable component is the indicia 904 overlaying pearl 902. In this case, indicia 902 are numerals directly indicative of the value of the prize. In other embodiments, such as shown in FIG. 10A-10B, the indicia indirectly indicate the value of the prize, such as "major" indicia 1002, "minor" indicia 1004 or "mini" indicia 1006. It will be appreciated that the indicia can also be in other forms, which may also be indicative of a prize. For example, the car icon indicates that the player has the opportunity to, or has, won a car. In some embodiments, the indicia may indicate only a portion of a prize. Continuing with the car example, the car icon may be split into four portions, each portion being assigned to a different configurable symbol. In such embodiments, all four portions of the car icon are required to be selected for display in order for the car prize to be won.

In one embodiment, at least one value of the respective prizes is generated by randomly selecting one of a plurality of defined multipliers that is applied to an amount wagered on the base game from which the feature is game triggered. This is accomplished at step 706 using value assigner 622C, which selects the defined multipliers from value data 644 using a value obtained from the random number generator (RNG) 621, applies the multiplier to the initial wager to obtain a prize value and assigns the prize value to each of the configurable symbols selected by symbol selector 622A. The plurality of defined multipliers in this embodiment are selected at random according to a weighted probability based at least in part on the amount wagered on the base game. That is, for at least each configurable symbol which will be displayed, the value assigner 622C obtains a value from RNG 621 and uses this to determine from the weighted table which value to assign. In an embodiment, the assignment of values to the configurable symbols is performed by the value assigner 622C after the symbols have been selected and the game controller knows they will be displayed but before they are displayed on the display. In another embodiment, the assignment occurs after the symbols have been displayed on display 54. In an embodiment, values are assigned to all configurable symbols irrespective of whether they will be displayed.

In this or other embodiments, at least one value of the respective prizes may comprise a defined value and/or a jackpot. As used herein, the term "jackpot", as opposed to "prize", refers to a progressive prize which accumulates over multiple plays of the base game and/or the feature game. As will be appreciated, the jackpot may be funded from a variety of sources including from only the gaming machine 10 itself, or from a plurality of gaming machines 202—a so-called "link". Furthermore, the jackpot may be triggered by any means known in the art, such as by using a mystery trigger or by using the Hyperlink™ system developed by the applicant.

In another embodiment, the variable prizes may be randomly selected under the control of value assigner 622C from a set of available prizes. Specific prizes may be weighted so as to control the probability of certain prizes occurring. In some embodiments, there may be a plurality of sets of prizes and the value assigner 622C may be configured to choose the set of prizes from which values will be randomly selected on the basis of a player's wager in the base game.

Returning to FIG. 7, at step 710, outcome evaluator 623 monitors play of the base game and determines whether a trigger event has occurred. In this embodiment, a trigger event occurs when six configurable symbols appear on display 54. If a trigger event has not occurred, play of the base game continues and control reverts to step 702, once any awards are paid at step 708. However, if a trigger event does occur, the feature game initiates by first holding the configurable symbols in their respective display positions 824, at step 711. Outcome generator 622 causes the feature game to be displayed on display 54 by retrieving symbol data 642 from memory 64 and passing the data to display controller 625 which controls display 54 to display the feature game. In other embodiments, more than or less than six symbols will be required to trigger the feature game, or the feature game will be modified in a way that is proportional to the number of configurable symbols that are displayed to trigger the feature game. For example, the average or total prize achievable in the feature game may be increased in proportion to the number of configurable symbols appearing.

Figure 8:
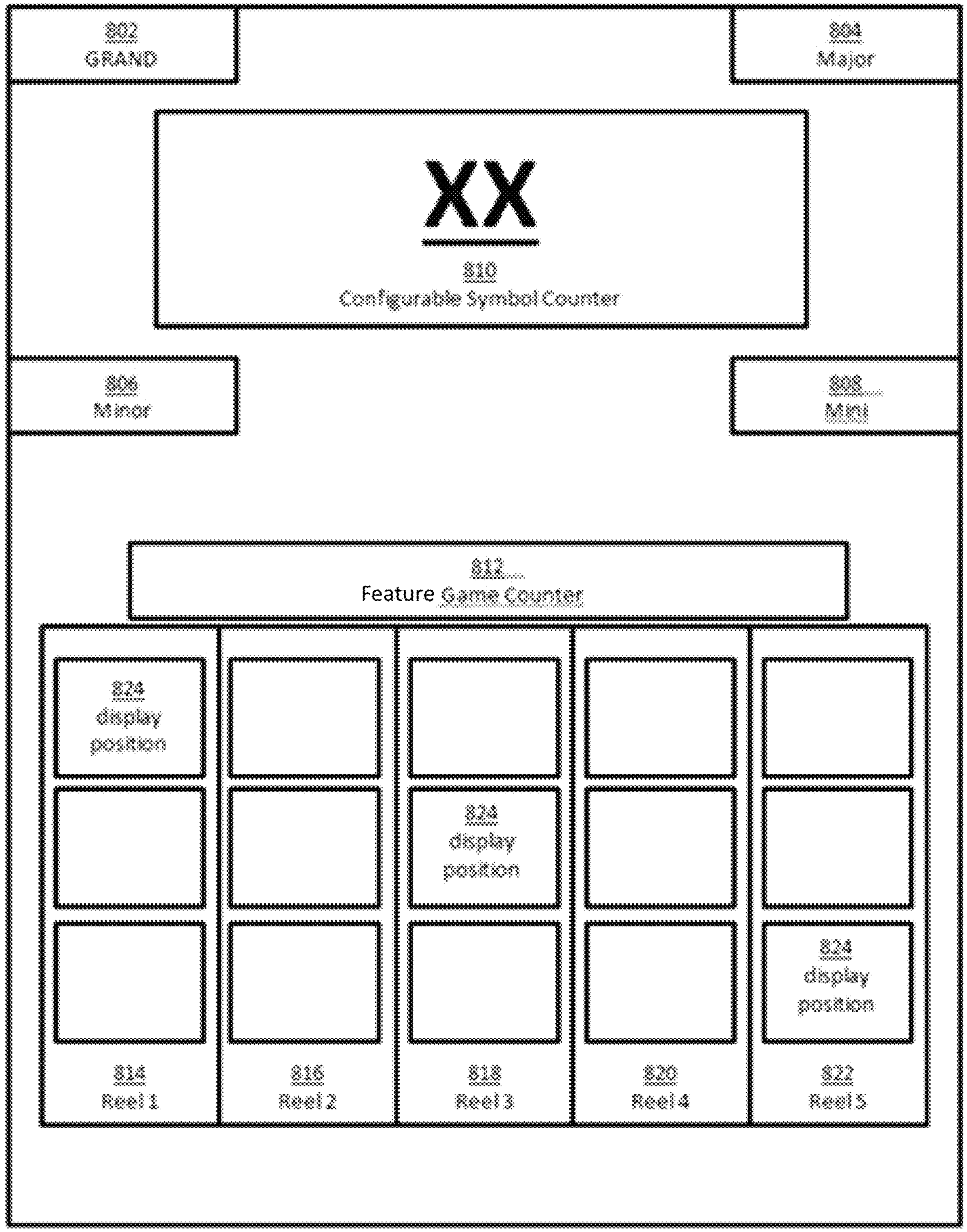
FIG. 8 is a representation of a screen of the feature game of FIG. 7.

When the feature game starts, the configurable symbol counter 810 of FIG. 8 is set to the number of configurable symbols that are held on reels 814-822, at step 712. In some embodiments, the configurable symbol counter 810 is an electronic counter in which the count is displayed in Arabic numerals In the display. In the preferred embodiment, this is also the number of configurable symbols which originally triggered the feature game. That is, in this embodiment, the configurable symbol counter 810 is initially set to 6, as six configurable symbols are required to trigger the feature game. Alternatively, if seven configurable symbols are selected for display, but only six are required for triggering the feature game, the configurable symbol counter 810 may be initially set to seven.

Once configurable symbol counter 810 is set, control moves to step 714 which sets feature game counter 812 to the defined number of feature games. In an embodiment, the preferred number of feature games is three, so counter 812 is set to 3. In other embodiments, the number of feature games may be more than or less than three, or may be derived by the game controller from the number of configurable symbols that appear. For example, an additional feature game may be offered for each configurable symbol that appears in addition to a defined minimum (for example, six) required to trigger the feature game.

Then, similar to the base game, the symbol selector 622A selects symbols from symbol data 642 to be displayed in the other display positions 824 not already displaying a configurable symbol, via display controller 625, at step 716. Note that in this embodiment, symbols in the feature game are selected from the full set of symbols defined by symbol data 642, including any configurable symbols. In other embodiments, the symbols may be selected from a reduced set of symbols taking into account of the configurable symbols already held. In an alternative embodiment, the symbols may be selected from an increased set of symbols. For example, symbols may be purchased or otherwise awarded for addition to the reel strip prior to the initiating the feature game. If one or more configurable symbols are selected, value assigner 622C assigns randomly selected values to each configurable symbol.

Outcome evaluator 623 then monitors play of the feature game to determine whether a configurable symbol is selected and displayed at step 718. If a configurable symbol is not displayed, feature game counter 812 is decremented by a defined amount at step 720. In the preferred embodiment, feature game counter 812 is only decremented by one, but of course the counter may be decremented by any number as is known in the art.

If there are a number of feature games remaining as determined by controller 60 at step 722, control returns to step 716 to continue the feature game. On the other hand, once the number of feature games is depleted, that is, when the feature game counter 812 reaches zero, an end condition is met, the feature game ends and control returns to step 702 after any prizes are paid at step 728. In one embodiment, the accumulated value of all the individual prizes as indicated by the variable components of the collected configurable symbol is paid at step 728.

Returning to step 718, if outcome evaluator 623 determines that at least one configurable symbol is displayed on reels 814-822, then that symbol is held on the reel, at step 723, and the configurable symbol counter 810 is incremented at step 724. Outcome evaluator 623 then checks whether a defined number of configurable symbols has been displayed on reels 814-822 at step 726 and, if the defined number has been reached, a jackpot is paid at step 728.

The defined number of configurable symbols required to trigger a jackpot in this embodiment is fifteen. That is, for this embodiment in which a game is implemented using a 5×3 matrix, configurable symbols must be selected and displayed in all the matrix positions of reels 814-822. In other embodiments, the defined number may be more than or less than fifteen. For example, in a 3-4-3-4-3 matrix configuration discussed as discussed above, the number of configurable symbols required to fill all matrix positions would be 17. In yet other embodiments, not all of the matrix positions need necessarily be filled, and the number of configurable symbols required may be determined randomly.

While in the above embodiments, an end condition is that the feature game ends when the Grand jackpot 802 is triggered at step 726. In other embodiments, the feature game does not necessarily end at this point. In such embodiments, one or more of reels 814-822 are configured to expand and display additional configurable or non-configurable symbols when counter 810 reaches the defined number. For example, a game implemented using a 5×3 matrix may expand to a 3-4-3-4-3 configuration. In such embodiments, a prize in addition to the Grand jackpot 802 is paid if configurable symbols are also selected for display in those additional positions.

Alternatively, if outcome evaluator 623 determines that the defined number of configurable symbols has not been reached at step 726, the feature game continues. In the embodiment of FIG. 7, each time a configurable symbol is displayed and the jackpot is not won, feature game counter 812 is reset to the default position by returning control to step 714, which in this embodiment is three as noted above. Therefore, the number of feature games awarded by the outcome evaluator 623 is indefinite and is not determined by a defined limit.

In this or other embodiments, if no configurable symbols appear on reels 814-822 in any of the feature games initially awarded, feature games counter 812 is reset. Such embodiments ensure the player is guaranteed to win a prize over and above the prize payable for triggering the feature game.

In the above embodiments, the jackpot paid in response to counter 810 reaching the defined threshold is Grand prize 802. The grand prize in this embodiment is a linked jackpot which receives contributions from a plurality of linked gaming machines and incremented based on the turnover of the linked machines. In some embodiments, a lower threshold of configurable symbols may be required for Major prize 804, Minor prize 806 or mini prize 808 to be won. Alternatively or additionally, as best shown in FIGS. 10A and 10B, Major, Minor and Mini prizes may be paid by assignment of those prizes to one of the configurable symbols, such as “major” indicia 1002, “minor” indicia 1004 or “mini” indicia 1006.

Note that in some embodiments, one or all of the Grand 802, Major 804, Minor 806 and Mini 808 prizes may all be implemented as jackpots, as fixed bonus amounts that do not increment or as a mixture of both. In the embodiment of FIGS. 9A to 10B, as noted above, Grand prize 802 is implemented as a linked progressive jackpot, while Major prize 804 is implemented as a standalone progressive (SAP) jackpot which only takes contributions from the gaming machine itself, incrementing the jackpot as a function of turnover. Minor 806 and Mini 808 prizes are implemented as fixed bonus amounts in proportion to the initial bet wagered. In some embodiments, Grand 802 prize may also be implemented as a SAP, or the Major 804 prize may also be implemented as a link.

This embodiment implements Grand 802 and Major 804 prizes as jackpots and, while both may be awarded simultaneously, neither can be awarded more than once in the same feature game. However, in other embodiments, either jackpot may be won multiple times within the same feature game. In such embodiments, players are awarded a seed value of the jackpot for subsequent triggers of that same jackpot.

As embodiments of the feature game described above automatically adjust awards based on turnover and proportionality to the initial wager, this invention is particularly suited to variable denomination games. Therefore, in some embodiments, controller 60 allows player selection of the minimum bet denomination. For example, before play of the game, controller 60 causes display controller 625 to output a message on display 54 requesting the player to select a minimum bet denomination. The player makes a selection through the game play mechanism 56 in response to which controller 60 adjusts the amount contributed to Grand 802 and Major 804 jackpot prizes and the magnitude of Minor 806 and Mini 808 bonus awards. Controller 60 also adjusts the weightings of the values in value data 644 from which value assigner 622C may assign to the configurable symbols. In one embodiment, there are four denominations available for selection, 1c, 2c, 5c and 10c. Those skilled in the art would appreciate that the denominations are not limited to four, but can include any suitable amount in any given currency. Note also that in this embodiment, while the selected denomination affects the magnitude of the Minor 806 and Mini 808 fixed bonus prizes offered, it does not affect the magnitude of the Grand 802 and Major 804 jackpots—only the contributions funding the amount.

Referring again to FIG. 7, it will be apparent that the flow chart includes a free game process at step 707. Like the spin and hold feature game, the free game process is a second game comprised of a plurality of games which occurs only periodically if a trigger condition is met.

Figure 11:
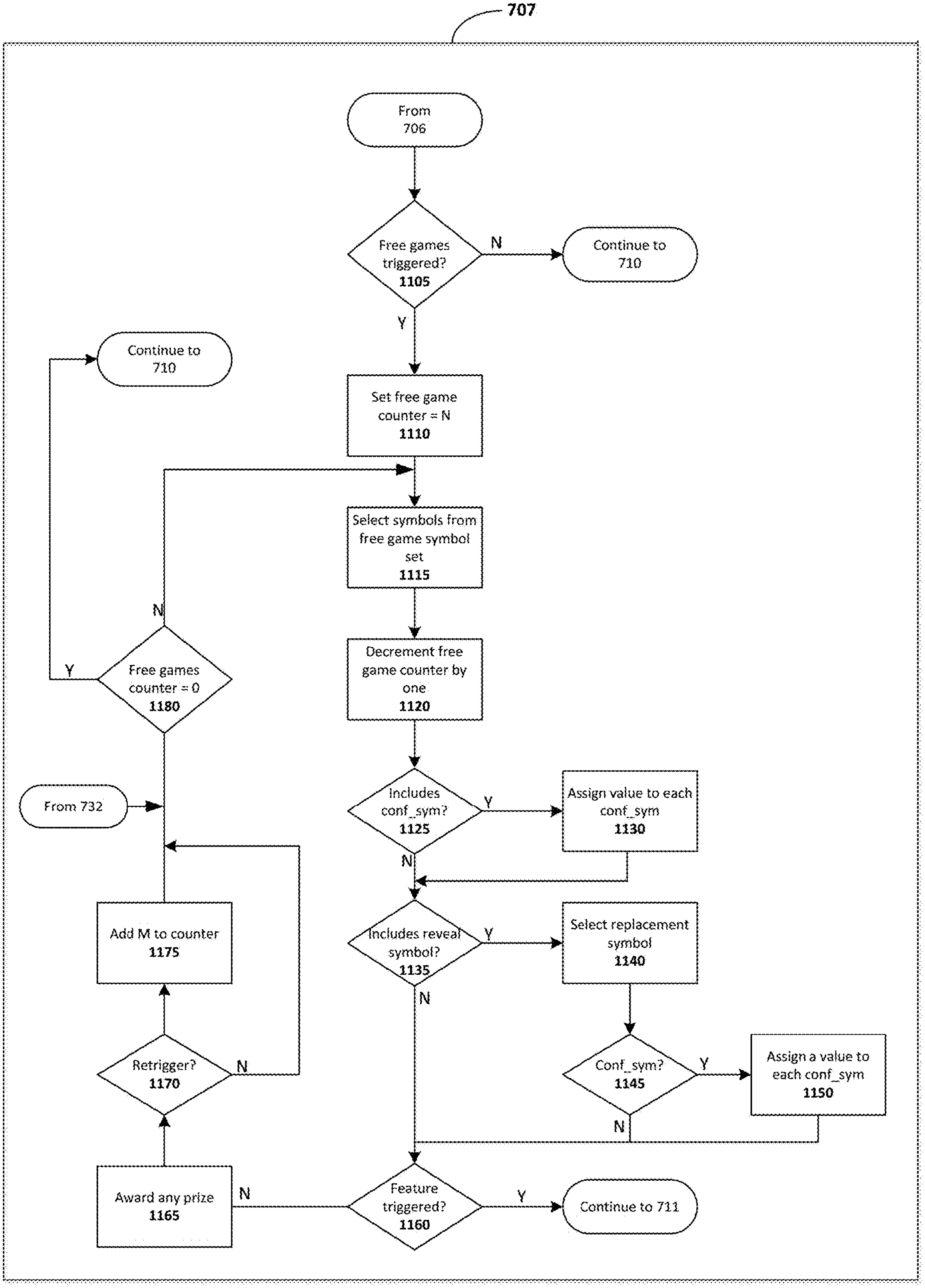
FIG. 11 is a flow diagram of a free games feature of the gaming machine.

The free game process 707 is detailed in FIG. 11. In an embodiment, the free game process 707 involves the step 1105 of determining whether the free game process is triggered. In an embodiment, the trigger is a defined number of a defined symbol being selected for display by the symbol selector. For example, three or more scatter symbols appearing anywhere in the display positions. If the free game process is not triggered, the process flow continues to step 710 (FIG. 7).

If the free game process is triggered, then at step 1110 a free game counter is set to a defined number of free games for play. For example, eight free games may be the defined number of games.

The free game process 707 then involves selecting symbols from a free game symbol set, at step 1115. In one example, the free game symbol set comprises a set of reels formed from the set of symbols used in the base game and a plurality of reveal symbols. The free game symbol set is stored in symbol data 642 (FIG. 6) together with the set of symbols to be used during the base game and the feature game.

It will be appreciated that in other embodiments, the symbols of the free game symbol set could be significantly different to the symbols used in the base game. For example, a reveal symbol could replace a symbol used in the base game as another example, no configurable symbols are in the free game symbol set. It will be appreciated that the preferred free game symbol set includes a mixture of configurable and non-configurable symbols as in the base game symbol set.

After the symbols have been selected at step 1115, the free game counter is decremented by one at step 1120. At step 1125, the free game process 707 involves determining whether the selected symbols include configurable symbols, and if so, the values are assigned to each configurable symbol at step 1130. Again, any of the options for assigning values to each configurable symbol described above can be used. In an embodiment, the free game process 707 for assigning values is the same as that used in the base game and the feature game.

As indicated above, the set of free game symbols includes a plurality of reveal symbols. A determination is made at step 1135 whether the selected symbols include one or more reveal symbols. If so, a process to select a replacement symbol from a set of replacement symbols is initiated at step 1140. In an example, the replacement symbol set comprises the full set of free game symbols. The set of replacement symbols will not include a defined symbol for the trigger condition (for example, a scatter symbol) so that the selection of a replacement symbol for the reveal symbol cannot lead to a retrigger of the free game process. In other embodiments, the replacement symbol set could be a reduced set of symbols, for example symbols that are in higher value winning combinations defined in a pay table. In other embodiments, no configurable symbols are in the replacement symbol set. Accordingly, in the embodiment, the set of replacement symbols includes at least one configurable symbol. Accordingly, one possible result of selection of the replacement symbol is for the configurable symbol to be selected. Irrespective of what symbol is selected, this symbol will replace all of the reveal symbols. Thus, the reveal symbol is termed a reveal symbol because it will reveal to the player the act of replacing with the replacement symbol. In an embodiment, at least one weighted table is used to control the selection of the replacement symbol. In an example, two weighted tables are used. A first table is used when at least one display position is not occupied by a reveal symbol, and a second table is used if all display positions are occupied by a reveal symbol. The second table is configured to change on per bet basis to ensure the chance of a configurable symbol being revealed is proportional to the total credits bet, thereby making the probability of winning the Grand Jackpot linear. It will be apparent why the gaming machine is configured to operate in this manner from the following description.

At step 1145, it is determined whether the replacement symbol is a configurable symbol. If the replacement symbol is a configurable symbol, then at step 1150, a value is assigned to each configurable symbol. Even though a configurable symbol is chosen to replace each reveal symbol, the values assigned to the respective configurable symbols can be different. In this respect, referring to FIG. 12 it will be apparent that there is shown an exemplary screenshot in FIG. 12A where the sixth free game in a series of free games is being carried out as indicated in free games counter 1210.

Figure 12A:
FIGS. 12A and 12B are screen shots of the free games feature.

It will be apparent in FIG. 12A that a display shows the gaming machine after a set of symbols have been selected for the free game where two configurable symbols 1226, 1227, have been selected but before the replacement symbol selected for the reveal symbols 1231, 1232, 1233, 1234, 1235, has been displayed. The configurable symbols 1226, 1227 are in the form of coin symbols having text thereon which show their configure values, in this example values of 1000 credits (configurable symbol 1226) and 250 credits (configurable symbol 1227). Five reveal symbols in the form of "Wanted Poster" symbols 1231 to 1235 have also been selected.

Figure 12B:
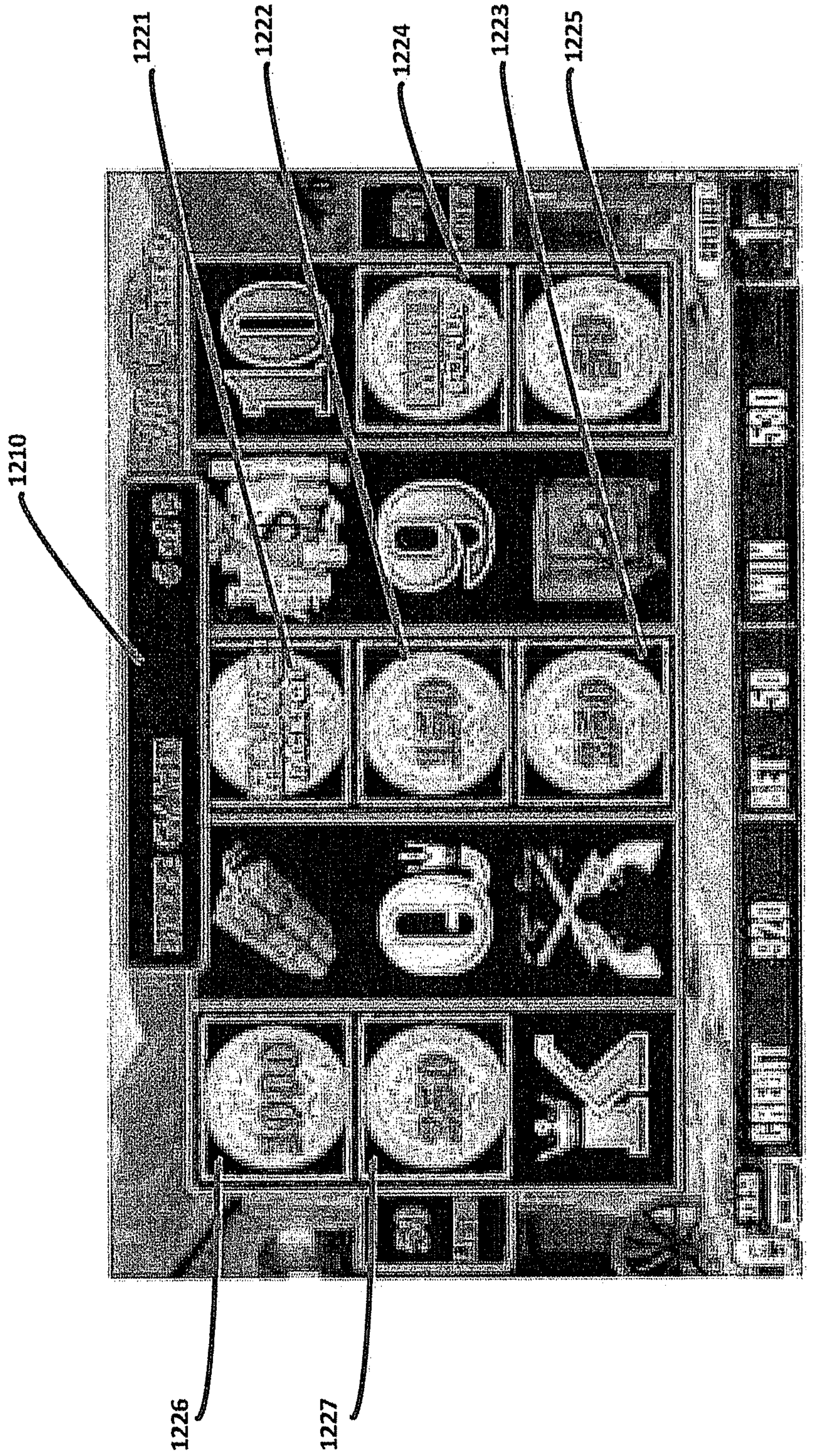

FIG. 12B shows the same free game of FIG. 12A after a replacement symbol has been selected for each reveal symbol. It will be apparent that the replacement symbol that has been selected is a configurable symbol and values have been assigned to each of the configurable symbol by the value assigner. Specifically, a major jackpot prize value has been assigned to configurable symbol 1221, a value of 150 credits has been assigned to configurable symbol 1222, a prize of 250 credits has been assigned to configurable symbol 1223, a prize of a mini bonus has been assigned to configurable symbol 1224, and a prize of 50 credits has been assigned to configurable symbol 1225.

Returning now to FIG. 11, it is determined at step 1160 whether the spin and hold feature game is triggered from the symbols selected in the free game using the same trigger condition used in the base game in respect of triggering the feature game, as described above. If so, the free game process 707 continues to steps 711 with all of the configurable symbols held in the manner described above in relation to FIG. 7. That is, the gaming machine operates such that the feature game described above is carried out as a result of the trigger condition being met within the free game process.

Otherwise, the process continues to awarding any prize at step 1165, and then at step 1170 determines whether a retrigger of the free game process is included within the set of symbols that were selected. In an embodiment, a retrigger is achieved by the same number of defined symbols appearing at scatter positions as was required to initially trigger the free game process. In an embodiment, the retrigger can be allowed on only the first occasion where it occurs. In an example, eight further free games are added to the free game counter at step 1175 if a retrigger occurs.

Once the feature game ends at step 722, the feature award is paid at step 728. Then at step 730, it is determined whether the feature game was triggered from the free game process 707 (of FIG. 11). If the feature was triggered from the free game process 707 (of FIG. 11), then at step 732 (of FIG. 7), the process flow returns to step 1180 (of FIG. 11) where it is determined if the free game process has ended. If the free game process has ended, the process flow continues to step 710 where it is determined whether the free game process terminated with a feature trigger. If the free game process terminated with a feature trigger, the feature game is played at step 711, and then the process flow is returned to base game play at step 730. As will suggest itself, step 1180 (in another embodiment) may flow directly back to the base game at step 702.

If at step 1180, the free game counter is greater than zero the process continues to step 1115 and a further free game is carried out by selecting further symbols and carrying out the subsequent steps described above.

It will be apparent from the above description that an advantage of the free game process 707 described in FIG. 11 is that the gaming machine is constructed so as to provide a second opportunity for the player to trigger the feature game by means of the use of the free game process. As such, the gaming machine is constructed such that the free game series is integrated with the hold and spin feature game. Further, this is done so in a manner which ensures that once the feature game is triggered, the player has at least a guaranteed prize from the values of the configurable symbols. Accordingly, the embodiments provide a significantly improved method of operating a gaming machine.

EXAMPLES

More specific examples of embodiments of the invention are now described with reference to FIGS. 9A-10B. In general, as shown in these Figures, the game has a traditional 3×5 grid layout, and is referred to in the examples below as the "Hold & Spin" feature.

Referring to FIG. 9A, the Hold & Spin feature is triggered when six 6 pearl symbols 902 are selected for display. When triggered, pearls 902 are held in their respective display positions, being all of column 1, column 2 rows 1 and 2 and column 5 row 1, and the controller 60 waits for a player instruction to initiate the game through game play mechanism 56. In some embodiments, controller 60 will wait indefinitely while in other embodiments, controller 60 will wait for a defined period of time before automatically initiating the game.

At this point, counter 810 is set to 6, and the player is guaranteed to win the accumulated value as indicated by the variable components 904 of the six pearls 902. That is, even before play of Hold & Spin starts, the player has won 4,300 credits in the embodiment of FIG. 9A.

Moving on to FIG. 9B, the player has spun an additional 4 pearls 902. Accordingly, counter 810 is incremented from 6 to 10 and feature games counter 812 is reset to default, which is 3 feature games in this embodiment. As compared to FIG. 9A, the additional pearls 902 are selected for display at display positions C2R3, C3R1, C4R3 and C5R2, and are also held at those positions for the subsequent games.

Over the remaining feature games, the player spins only an additional one pearl 902, displayed at C4R1, as shown in FIG. 9C. Accordingly, the feature games end, and the player wins the accumulated value of the values indicated on pearls 902. In this case, the total award is the 4,300 credits for the six pearls 902 that originally triggered the Hold & Spin game, plus the additional 5 pearls 902 selected during play of the Hold & Spin game—5,800 credits. In this embodiment, the accumulated award is totalled at the end of the Hold & Spin game and first transferred to the win meter 908 before being transferred to the credit meter 910 by the controller 60. Meter data 648 is adjusted accordingly before the next game can be initiated at step 702. In alternative embodiments, the accumulated award may bypass the win meter and be credited directly to the credit meter.

FIGS. 10A and 10B are examples showing the jackpots being own. In FIG. 10A, value assigner 622C has assigned "Major" indicia 1002 to pearl 902, which has been selected for display at C4R1. This triggers Major prize 804 which, in one embodiment, is paid directly into credit meter 910 rather than first into win meter 908. That is, jackpot wins are paid immediately when they are won rather than being accumulated at the end of the Hold & Spin game as per the other prizes described above. Thus in the FIG. 10A embodiment, Major jackpot 804 is paid when the associated pearl 902 is selected, while the remaining 4,000 credits will be accumulated and paid at the completion of the feature game, in addition to any new pearls 902 that are selected and displayed in the remaining feature games. In alternative embodiments, the Major jackpot may be accumulated at the end of the feature game along with the other 4,000 credits, and the accumulated total may be paid first into win meter 908 or directly into credit meter 910.

FIG. 10B shows Grand jackpot 802 being triggered, as 15 pearls 902 have been selected for display in the matrix by the end of the feature game. Again, the Grand 802 jackpot is first accounted for and paid directly into credit meter 910, and the remaining prizes indicated by indicia 904 on pearls 902 are then accumulated and paid into win meter 908 before being transferred to credit meter 910. Therefore, in this FIG. 10B embodiment, the total winnings is made up of the initial Grand jackpot 802, plus 63,000 credits indicated by indicia 904 and Minor 806 and Mini 808 prizes indicated by "Minor" indicia 1004 and "Mini" indicia 1006. Again, in alternative embodiments, the Grand jackpot may be accumulated at the end of the feature game along with the other 63,000 credits, Minor prize 806 and Mini prize 808, and the accumulated total may be paid first into win meter 908 or directly into credit meter 910.

In another example, the configurable symbols may only be provided during part of the game, such as a feature game.

In another example, after a feature game is triggered, the game controller initiates a feature game using different reels to those used in the base game. In one example, in the feature game, individual reels are associated with each of the symbol display positions. That is, if there are fifteen symbol display positions, fifteen reels are available for use depending upon which of the display positions are occupied by the configurable symbols that caused the feature game to trigger. Each of the reels comprises a mixture of non-configurable symbols and configurable symbols. In the first feature game, the symbol selector determines stopping positions for all of the reels not occupied by a configurable symbol. If any of the reels are stopped with a configurable symbol in place, that configurable symbol is held in position by holding/locking the reel (i.e. not spinning the reels in a subsequent feature game). That is, in subsequent feature games, only the reels corresponding to symbol positions where a configurable symbol has not been displayed are re-spun. Each configurable symbol is assigned a value by value assigner by randomly selecting a prize value from a set of prize values. The set of prize values from which values are selected depends on the player's wager in the base game. As in the example, described above, a player is awarded the sum of the values of the configurable symbols at the end of the feature games and may be awarded an additional prize such as a jackpot prize depending on what value the counter reaches during the feature games.

In another example, the configurable symbol may have an alternative visual representation, for example, a door which opens once the configurable symbol is displayed in a display position to reveal the assigned prize value.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further, different parts of the program code can be executed by different devices, for example in a client server relationship. Persons skilled in the art, will appreciate that program code provides a series of instructions executable by the processor.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A gaming machine, comprising:

a display device for displaying a plurality of virtual reels;

a credit input mechanism for receiving a physical item representing a monetary value to establish a credit balance;

a player interface for selecting a wager amount funded by the credit balance and initiating play of a base game;

a game controller configured to control the play of the base game and play of a series of free games; and a payout mechanism for dispensing a payout of the credit balance;

wherein the game controller, during the play of the base game, is configured to:

spin the plurality of virtual reels to select and display a first plurality of symbols at a plurality of display positions on the display device, wherein the first plurality of symbols are selected from a base game set of symbols; and trigger the play of the series of free games when the first plurality of symbols at the plurality of display positions correspond to a trigger event;

wherein the game controller, during the play of the series of free games, is configured to:

spin the plurality of virtual reels to select and display a second plurality of symbols at the plurality of display positions, wherein the second plurality of symbols are selected from a free game set of symbols that includes a reveal symbol and a plurality of other symbols;

replace each instance of the reveal symbol in the second plurality of symbols with a replacement symbol while retaining each instance of the plurality of other symbols in the second plurality of symbols; and determine a game outcome based on each instance of the replacement symbol and the plurality of other symbols in the second plurality of symbols after each instance of the reveal symbol is replaced with the replacement symbol; and wherein:

each instance of the replacement symbol comprises a configurable symbol including a common component and a variable component; and the variable component of each instance of the replacement symbol is indicative of a value of a prize that is associated with the configurable symbol.

2. The gaming machine according to claim 1, wherein the game controller is further configured to:

select one of a plurality of defined multipliers based on the wager amount; and generate the value of the prize based on the selected one of the plurality of defined multipliers.

3. The gaming machine according to claim 2, wherein the game controller is further configured to randomly select one of the plurality of defined multipliers with a weighted probability based at least in part on the wager amount.

4. The gaming machine according to claim 1, wherein the value comprises a progressive value that proportionally increases based on the wager amount.

5. The gaming machine according to claim 1, wherein the game controller, during the base game, is further configured to trigger the play of the series of free games in response to the first plurality of symbols including a defined number of instances of a scatter symbol.

6. The gaming machine according to claim 1, wherein, during the series of free games:

the display device further includes a symbol counter; and the game controller is further configured to:

update the symbol counter to indicate a number of instances of the configurable symbol displayed by the display device; and award a jackpot in response to the display device displaying a defined number of instances of the configurable symbol, the jackpot being a progressive prize funded by contributions from a plurality of other gaming machines.

7. The gaming machine according to claim 1, wherein:

the display device further comprises a feature game counter; and the game controller, during the play of the series of free games, is further configured to update the feature game counter to indicate a number of feature games remaining in a series of feature games, and award a defined initial number of feature games when play of the series of feature games is triggered.

8. The gaming machine according to claim 7, wherein game controller, during the play of the series of feature games, is further configured to reset the feature game counter to the defined initial number of feature games in response to a spin of the virtual reels selecting the configurable symbol for display.

9. The gaming machine according to claim 7, wherein the game controller, during the play of the series of feature games, is further configured to decrement the feature game counter in response to a spin of the virtual reels selecting no configurable symbols for display.

10. The gaming machine according to claim 1, wherein the game controller is further configured to determine a prize value of the game outcome by accumulating respective values associated with each configurable symbol selected for display.

11. A method of wagering, comprising:
- receiving, with a credit input mechanism of a gaming machine, a physical item representing a monetary value;
- establishing a credit balance based on the monetary value of the physical item;
- receiving, via a player interface of the gaming machine, a wager amount funded by the credit balance;
- updating the credit balance based on the wager;
- during play of a base game of the gaming machine,
  - spinning a plurality of virtual reels for a display device of the gaming machine to display a first plurality of symbols at a plurality of display positions on the display device; and
  - triggering play of a series of free games when the first plurality of symbols at the plurality of display positions correspond to a triggering event; and
- during the play of the series of free games,
  - spinning the plurality of virtual reels to display a second plurality of symbols at the plurality of display positions, wherein the second plurality of symbols are selected from a free game set of symbols that includes a reveal symbol a plurality of other symbols;
  - replacing each instance of the reveal symbol in the second plurality of symbols with a replacement symbol while retaining each instance of the plurality of other symbols in the second plurality of symbols; and
  - determining a game outcome based on each instance of the replacement symbol and the plurality of other symbols in the second plurality of symbols after said replacing each instance of the reveal symbol; and
- causing, a payout mechanism of the gaming machine to, in response to receiving a payout input, initiate a payout associated with the credit balance,
- wherein:
  - each instance of the replacement symbol comprises a configurable symbol including a common component and a variable component; and
  - the variable component of each instance of the replacement symbol is indicative of a value of a prize that is associated with the configurable symbol.

12. The method according to claim 11, further comprising:
- selecting, via a game controller of the gaming machine, one of a plurality of defined multipliers based on the wager amount; and
- generating the value of the prize based on the selected one of the plurality of defined multipliers.

13. The method according to claim 12, further comprising randomly selecting one of the plurality of defined multipliers with a weighted probability based at least in part on the wager amount.

14. The method according to claim 11, wherein the value comprises a progressive value that proportionally increases based on the wager amount.

15. The method according to claim 11, further comprising triggering the play of the series of free games in response to the first plurality of symbols including a defined number of instances of a scatter symbol.

16. The method according to claim 11, further comprising, during the series of free games:
- displaying a symbol counter via the display device; and
- updating the symbol counter to indicate a number of instances of the configurable symbol display by the display device; and
- awarding a jackpot in response to the display device displaying a defined number of instances of the configurable symbol, the jackpot being a progressive prize funded by contributions from a plurality of other gaming machines.

17. The method according to claim 11, further comprising, during the play of the series of free games,
- displaying, via the display device, a feature game counter;
- updating the feature game counter to indicate a number of feature games remaining in a series of feature games; and
- awarding a defined initial number of feature games when play of the series of feature games is triggered.

18. The method according to claim 17, further comprising resetting the feature game counter to the defined initial number of feature games in response to a spin of the virtual reels selecting the configurable symbol for display.

19. The method according to claim 17, further comprising decrementing the feature game counter in response to a spin of the virtual reels selecting no configurable symbols for display.

20. The method according to claim 11, further comprising determining a prize value of the game outcome by accumulating respective values associated with each configurable symbol selected for display.

21. The gaming machine according to claim 1, wherein the game controller is further configured to separately assign the variable component of each instance of the replacement symbol such that one or more instances of the replacement symbol have a different associated prize value.

22. The gaming machine according to claim 1, wherein the game controller, during the play of the series of free games, is further configured to:
- hold each configurable symbol at its display position;
- respin the plurality of virtual reels to select and display another plurality of symbols for non-held symbols in the plurality of display positions;
- replace, in response to the another plurality of symbols including at least one instance of the reveal symbol, each instance of the reveal symbol with the configurable symbol;
- reduce a quantity of free games remaining in the series of free games when the respin fails to add another instance of the configurable symbol to the display device;
- reset the quantity of free games remaining in the series of free games to an initial quantity when the respin adds another instance of the configurable symbol to the display device;

repeat the hold, the respin, the replace, the reduce, and/or the reset until the quantity of free games remaining is none or until a threshold number of configurable symbols are held; and initiate a feature game based on instances of the configurable symbol held in the plurality of display positions.

23. The gaming machine according to claim 22, wherein the game controller, during the play of the series of free games, is further configured to initiate the feature game when a triggering number of configurable symbols are displayed.

24. The gaming machine according to claim 22, wherein:

the display device further comprises a symbol counter; and the game controller is further configured to update the symbol counter to indicate a count of instances of the configurable symbol held in the plurality of display positions.

25. The gaming machine according to claim 22, wherein:

the free game set of symbols further includes the configurable symbol; and the another plurality of symbols are selected from the free game set of symbols.

26. The method according to claim 11, further comprising separately assigning the variable component of each instance of the replacement symbol such that one or more instances of the replacement symbol have a different associated prize value.

27. The method according to claim 11, further comprising, during the play of the series of free games:

holding each configurable symbol at its display position;

respinning the plurality of virtual reels to select and display another plurality of symbols for non-held symbols in the plurality of display positions;

replacing, in response to the another plurality of symbols including at least one instance of the reveal symbol, each instance of the reveal symbol with the configurable symbol;

reducing a quantity of free games remaining in the series of free games when the respin fails to add another instance of the configurable symbol to the display device;

resetting the quantity of free games remaining in the series of free games to an initial quantity when the respinning adds another instance of the configurable symbol to the display device;

repeating the holding, the respinning, the replacing, the reducing, and/or the resetting until the quantity of free games remaining is none or until a threshold number of configurable symbols are held; and initiating a feature game based on instances of the configurable symbol held in the plurality of display positions.

28. The method according to claim 27, further comprising, during the play of the series of free games, initiating the feature game when a triggering number of configurable symbols are displayed.

29. The method according to claim 27, further comprising updating a symbol counter of the display device to indicate a count of instances of the configurable symbol held in the plurality of display positions.

30. The method according to claim 27, wherein:

the free game set of symbols further includes the configurable symbol; and the respinning selects the another plurality of symbols from the free game set of symbols.

* * * * *